Figure 1:
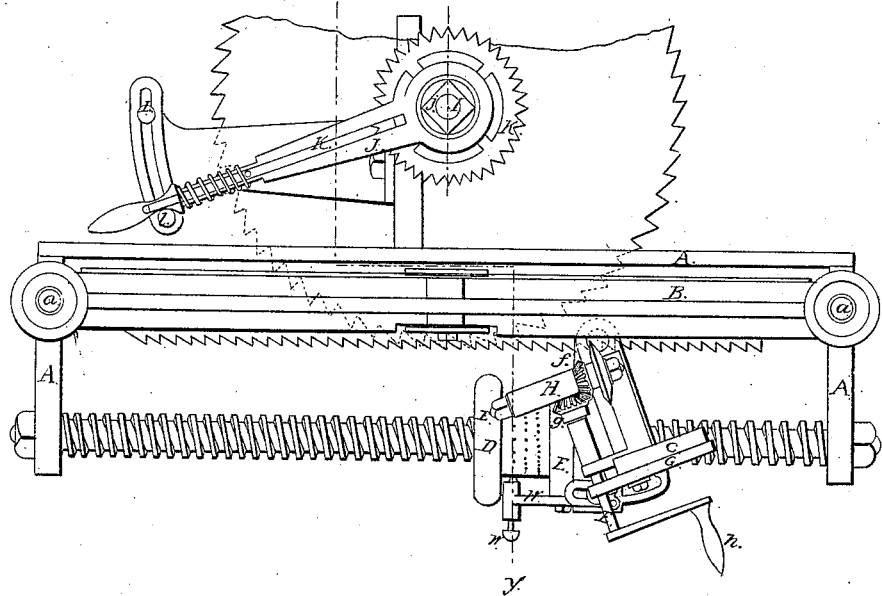

Sheet 1, 2 Sheets.

W. Tucker.
Saw Sharpener.
N° 90,972.  Patented Jun. 8, 1869.

Witnesses:
W. B. Deming
Wm. H. Burton Jr.

Inventor:
Wm. Tucker
by Knight Bro.
Attorneys

W. Tucker.

Saw Sharpener.

N° 90,972. Patented Jun. 8, 1869.

Witnesses:
W. B. Deming
Wm. H. Brereton Jr

Inventor:
Wm Tucker
by Knight Bro
Attorneys

United States Patent Office.

WILLIAM TUCKER, OF PHILADELPHIA, ASSIGNOR TO HIMSELF AND PRINCE A. SNELL, OF PITTSBURG, PENNSYLVANIA.

Letters Patent No. 90,972, dated June 8, 1869.

IMPROVEMENT IN SAW-FILING MACHINES.

The Schedule referred to in these Letters Patent and making part of the same.

*To all whom it may concern:*

Be it known that I, WILLIAM TUCKER, of Philadelphia, in the county of Philadelphia, and State of Pennsylvania, have invented a new and useful Improvement in Machines for Filing Saws; and I do hereby declare the following to be a full, clear, and exact description of the same, reference being had to the annexed drawings, forming part of this specification.

My invention relates to that class of machines for filing saws, in which a rotary file or cutter is used; and my improvements consist in a superior construction and arrangement of the rotary file or cutter, and its adjusting and operating-mechanism, and the saw-clamping devices; and also in a novel and simple supplementary clamp and feeding-device for circular saws, as hereinafter more particularly referred to; the object of my invention being to produce a strong, simple, and compact machine, adapted for both circular and straight saws, and capable of forming the teeth uniformly and perfectly, and of any desired form and angle.

In the drawings—

Figure 2:
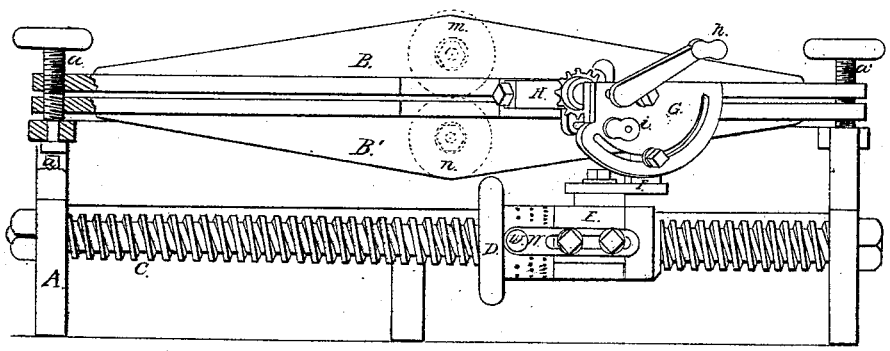
Figure 3:
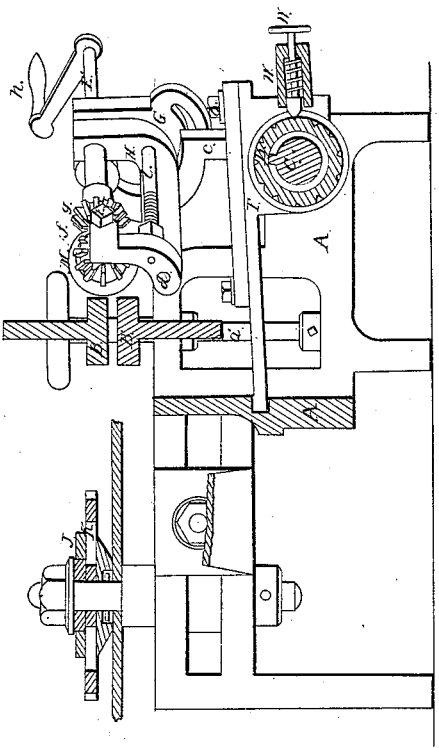

Figure 1 is a plan view of my improved machine;

Figure 2, a front elevation;

Figure 3, a section through the line $y$; and

Figure 4:
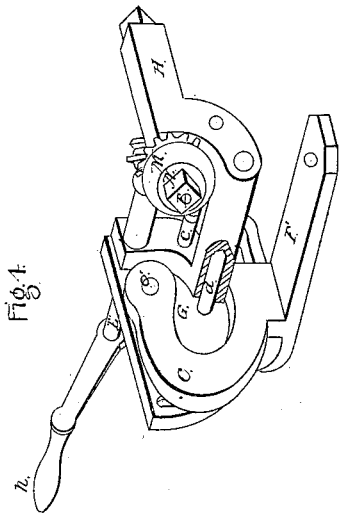

Figure 4, a perspective view of the rotary file or cutter, with its adjusting-plates detached from the carriage.

Figure 5:
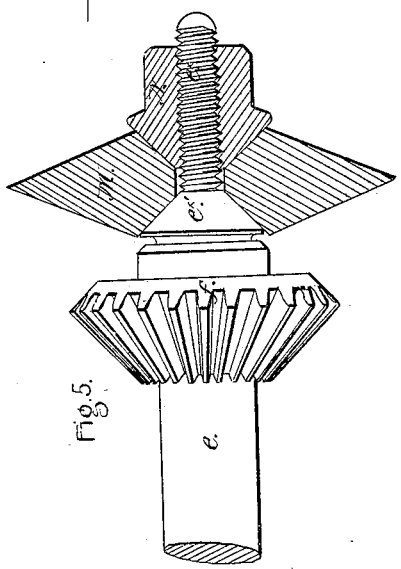

Figure 5 is an enlarged axial section of the file or cutter in position on its arbor or shaft.

A is the frame, in the ends of which are mounted the shafts $a\ a'$, which are provided above the frame with right and left-hand screws for moving the jaws or clamps B B', which may be of any length required, simultaneously and equally to and from the saw, so that the centre of the saw, or a plane parallel and equidistant from the two surfaces of the same, shall always be in a line with the axis of the rotary file or cutter, to insure teeth of uniform size.

C is a screw-shaft, secured in each end of the frame, and forming a brace for the same.

Upon this screw is an index-nut, D, for moving the file-carriage successively, the proper distance for each tooth, and it is provided with several rows of holes for spacing different-sized teeth.

These holes receive the pin $w$, mounted in the stand W, which can be adjusted to the different rows of holes.

On the nut D is mounted the carriage or plate E, the rear end of which extends back and enters a groove in the frame, by which it is supported and kept from turning.

Upon the carriage at $o$, is pivoted the segmental slotted plate F, which can be adjusted to make the tooth fleam-shaped, square-faced, or hooked, with any desired angle to suit the character of the work, and retained by the screw $b$.

The plate F has a standard, C, on which is pivoted the segmental plate G, which is adjusted to impart the proper bevel to the teeth.

In filing a crosscut-saw, every successive tooth is bevelled in an opposite direction.

This is accomplished with the machine, by canting or turning the file on the centre $o'$, first one way, to file every alternate tooth, and then in the opposite direction, to file the intervening teeth.

Projecting from the back of the plate G, is a stud, $d$, upon which is mounted the frame H.

This frame forms bearings for the cutter-shaft $e$, and the crank-shaft $e'$, by which the file or cutter is operated through the bevel-gears $f$ and $g$.

The frame H slides on the stud $d$, having a back-and-forward motion for presenting the file to, and withdrawing it from the saw, controlled by the crank $h$, and the extent of which motion is regulated for the depth of tooth required by the gauge-screw $i$. This operation can be performed, and the rotation of the file continued by one hand, while the other is applied to the index-nut to be ready to advance the carriage for the next tooth.

The shaft or arbor $e$, is provided, for the reception of the file or cutter M, with a contracted portion $e^*$, (see fig. 5) having a bevelled or conical shoulder $e^{*'}$, and threaded for the reception of a clamping-nut, N, the inner side of which is of corresponding form with the shoulder $e^{*'}$. The file or cutter M, is of annular form, and countersunk on both sides to correspond with the conical shoulder $e^{*'}$, and nut, N, by which means its concentricity with the shaft is secured, the large amount of frictional surface thus produced, also greatly increasing the efficiency of the coupling.

In the rear of the frame is mounted a mechanism for holding and rotating a circular saw, the file-carriage in this case being stationary.

I is an arbor made adjustable in relation to the file or cutter for different-sized saws.

The saws are fastened to the arbor by the nut $j$, and rotated to present the teeth successively to the file, by the lever J, and the catch $k$, engaging into the teeth of the wheel K.

The extent of motion imparted to the lever, and consequently the number of teeth of the wheel engaged, are determined by the studs L $l$, one of which is adjustable. The number of teeth should be the same as in the saw, or a multiple of the number.

The saw is clamped near its edge, in close proximity to the file, by the wheels $m\ n$, on the clamps B B', which, while they hold the saw firmly, admit of its rotation. These wheels should project sufficiently beyond the face of the clamps, to allow free movement of the saw-teeth between the clamps B B', and for this reason must be removed for straight saws.

With this invention, saws of all kinds can be filed with a great saving of time and material, and with a precision which insures straight and smooth working.

What I claim as my invention, and desire to secure by Letters Patent, is—

1. The arrangement of the rotary file M, the clamp-jaws B B', either with or without the anti-friction rollers $m$ $n$, and the right and left-hand screws $a$ $a$, for operating said jaws B B', substantially as shown and described.

2. The stationary screw-shaft C, forming a part of the frame of the machine, and a support for the file-carriage, as represented and described.

3. The travelling index-nut D, in combination with the stationary screw-shaft C and file-carriage, E, constructed and operating substantially in the manner described, for the purpose specified.

4. The double countersunk circular file or cutter M, held between the conical or bevelled shoulder $e^*$, of the arbor $e$, and the conical or bevelled clamping-nut N, substantially as and for the purposes described.

5. In combination with the rotary file or cutter M, the sliding frame H, provided with the gauge-screw $i$, and constructed and operated substantially in the manner and for the purposes specified.

6. The arrangement of the sliding frame H, file or cutter M, gearing $f$ $g$, shaft $e'$, and crank $h$, all constructed and operating substantially in the manner described.

7. The arrangement of the shouldered arbor I, clamping-nut $j$, ratchet-wheel K, lever J, catch $k$, and studs L $l$, all constructed to operate substantially in the manner described, for the purpose specified.

To the above specification of my invention, I have signed my hand, this 14th day of November, 1868.

WILLIAM TUCKER.

Witnesses:
   WM. B. DAYTON,
   P. A. SORRELL.